April 7, 1964
H. HORNSCHUCH ETAL
3,128,400
CLUTCH MECHANISM
Filed July 13, 1961
2 Sheets-Sheet 1
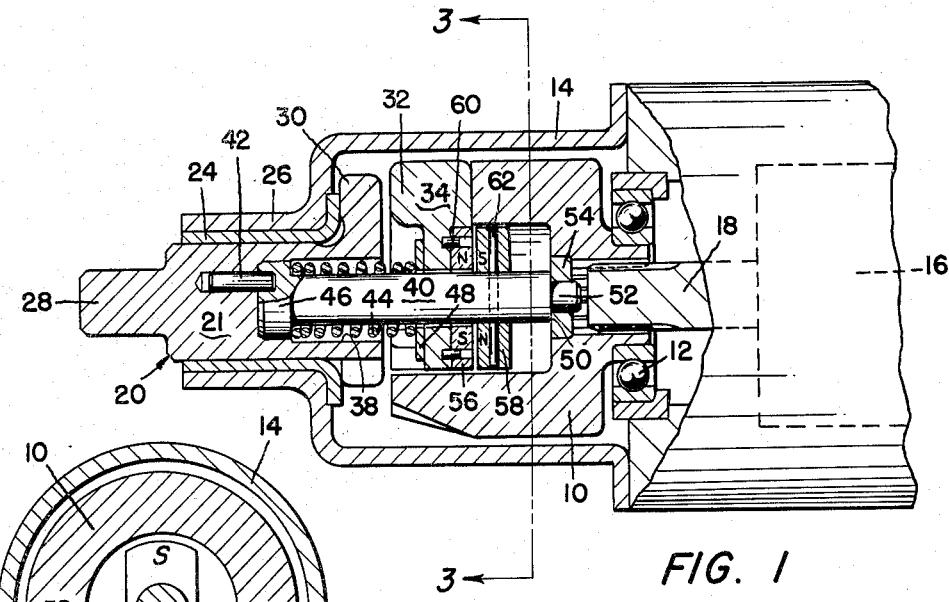
FIG. 1
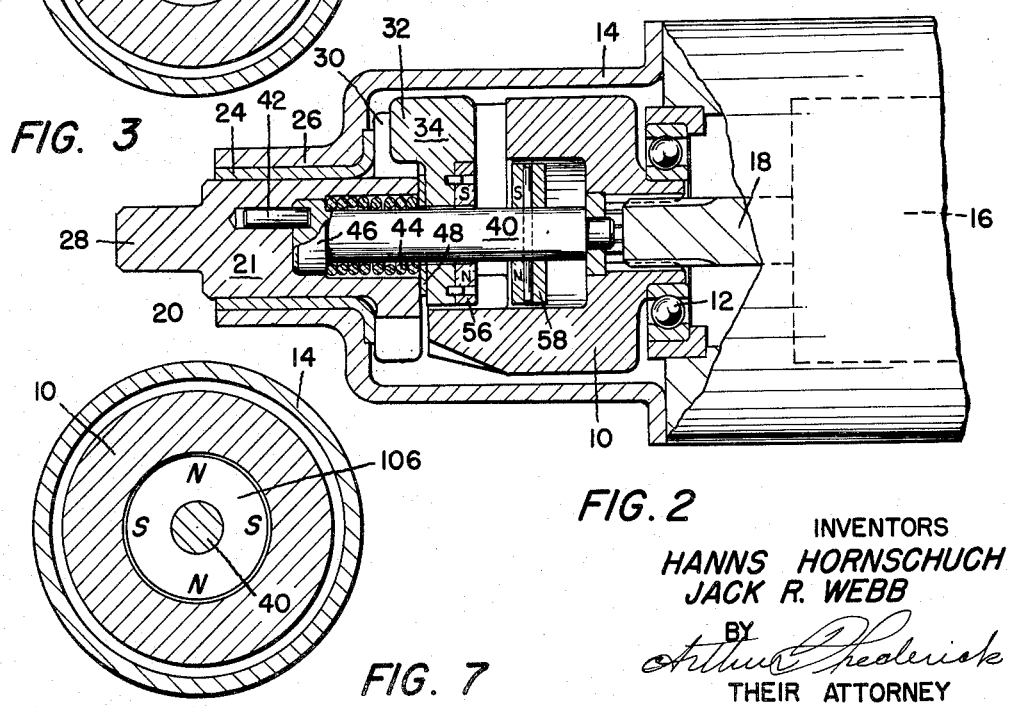
FIG. 3
FIG. 2
FIG. 7
INVENTORS
HANNS HORNSCHUCH
JACK R. WEBB
BY
*Arthur Frederick*
THEIR ATTORNEY April 7, 1964  H. HORNSCHUCH ETAL  3,128,400
CLUTCH MECHANISM
Filed July 13, 1961  2 Sheets-Sheet 2

INVENTORS
HANNS HORNSCHUCH
JACK R. WEBB
BY
*Arthur Frederick*
THEIR ATTORNEY

United States Patent Office 3,128,400
Patented Apr. 7, 1964

3,128,400
CLUTCH MECHANISM
Hanns Hornschuch, Easton, and Jack R. Webb, Bethlehem, Pa., assignors to Ingersoll-Rand Company, New York, N.Y., a corporation of New Jersey
Filed July 13, 1961, Ser. No. 123,824
10 Claims. (Cl. 310—100)

This invention relates to clutch mechanisms and particularly to an intermittently engageable clutch.

The clutch of this invention is particularly useful as applied to an impact wrench or the like wherein is provided a driving member of substantial mass which is adapted, through jaws, to impact a driven member commonly called an anvil which is provided with a working implement such as a screw driver blade, or socket, for engagement with nuts and the like.

A great variety of such mechanisms have been devised heretofore. Some of them have clutches which are in engagement until a certain degree of resistance is encountered by the working implement. This would appear to be refinement of questionable value in many cases, because in the so-called "run down" period there is substantially no resistance encountered and what little may exist is easily overcome by at most, a very few impacts of the clutch mechanism. In any of the more effective tools the impacting is produced by a hammer which is the driving element of the clutch mechanism and which by engagement of the clutch is retarded thereby as it strikes its blow. It is automatically disengaged from the driven member to accelerate to a higher rotational velocity at which reengagement and impacting again occurs effected by parts influenced by the relative speed of the driving and driven members. Parts effecting the reengagement heretofore have been of a mechanical nature such as cams and the like which wear and get out of order.

By this invention, engagement of the clutch is effected by magnetic means employing preferably permanent magnets. In the preferred form the magnets do not contact each other and therefore one element of wear is eliminated. Their use has other advantages which will be apparent in the following description.

It is accordingly an object of this invention to produce a mechanism of an intermittently engageable clutch useful particularly as the impacting mechanism of machines such as impact wrenches and the like, which is positive in its action, durable, inexpensive to manufacture.

Figure 4:
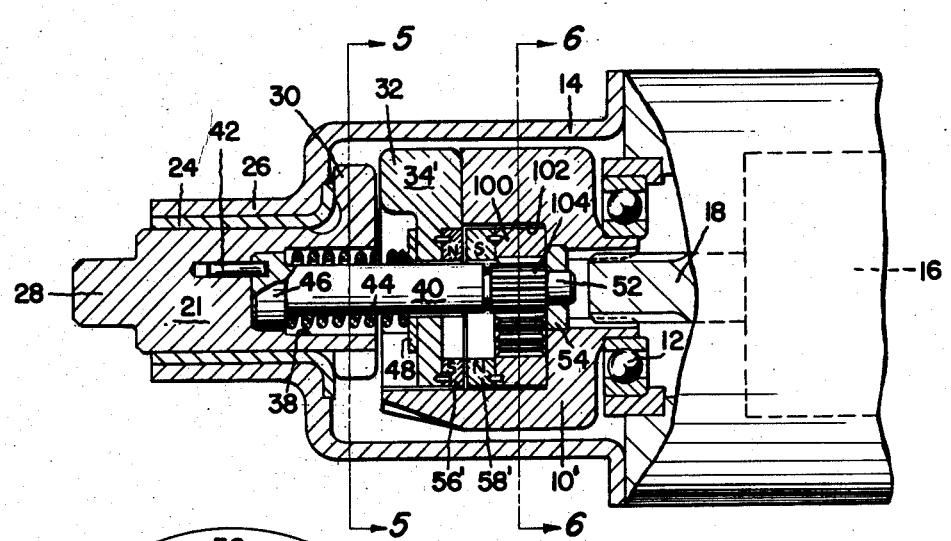
Figure 5:
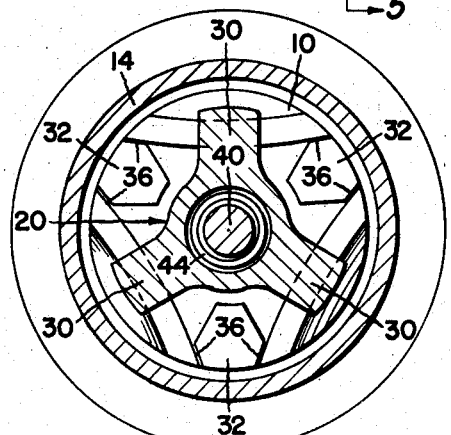
Figure 6:
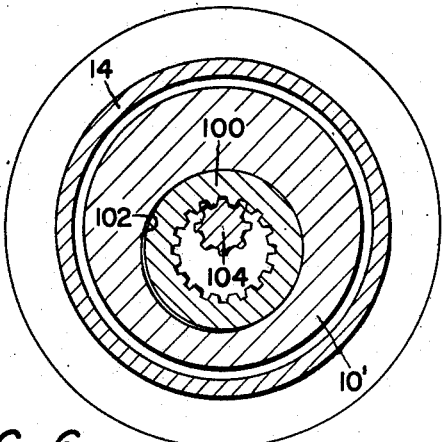
Figure 8:
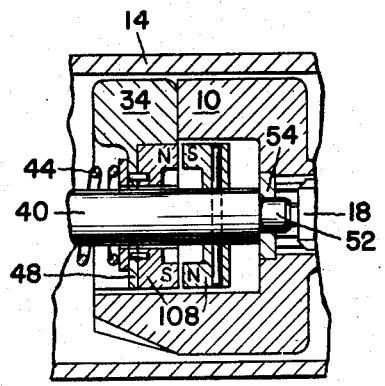

The invention will be more completely understood by reference to the following description of preferred embodiments, reference being had to the accompanying drawings, in which:

FIGURE 1 is a longitudinal central section of an impact tool constructed in accordance with the invention and in which principally the impacting clutch is shown, FIG. 2 is a section like that of FIG. 1 showing the driven clutch jaws in engagement with the jaws of the driven member, FIG. 3 is a cross section taken along the line 3—3 of FIG. 1 looking in the direction of the arrows, FIG. 4 is a longitudinal axial section through the clutch mechanism as applied to an impact wrench, this view being of an embodiment which permits clutching of the driving and driven members upon more than a single revolution with respect to each other, FIG. 5 is a cross section of the embodiment of FIG. 4 taken along the line 5—5 looking in the direction of the arrows, FIG. 6 is a view in section taken along line 6—6 of FIG. 4, FIG. 7 is a sectional view similar to FIG. 3 showing another form of magnet that may be employed in the impact tool according to this invention, and FIG. 8 is a fragmentary view in section showing a magnet in U-shaped form which may be used in the impact tool according to the present invention.

Referring to the drawings the clutch mechanism includes a driving member 10 which may be, and is in this instance a massive rotating hammer of an impact wrench it being outwardly cylindrical and journaled for rotation in bearings 12 mounted in the tool casing 14 only a portion of which is shown as the rest is irrelevant to the description of the invention.

Driving member 10 gets its driving force from a motor indicated at 16 within casing 14 and having a drive shaft 18 with a splined connection to driving member 10. Driving member 10 is adapted to engage driven element 20 which is in this instance that portion of an impact tool commonly called an "anvil" and which has a cylindrical portion 21 adapted to rotate in a flange bushing 24 mounted in the nose 26 of casing 14. The squared end 28 of anvil 20 extends outwardly to receive a suitable working implement (not shown), such as a socket.

As shown in FIG. 2 anvil 20 is provided with jaws 30, in this instance three, angularly spaced apart with respect to the axis of rotation of anvil 20. Jaws 30 are adapted to be engaged by corresponding jaws 32 also three in number carried by driving member 10. For convenience, jaws 32 form part of a spider 34 so that they act as a unit, or set, and they are movable with respect to driving member 10 in an axial direction with respect to the axis of member 10 which is, as shown, coaxial with driven member 20. For this purpose the jaws 32 are longitudinally slidable in longitudinal slots 36 formed in the end of member 10 adjacent jaws 30.

Within a central bore 38 in anvil 20 is mounted a stem 40 adapted to be rotated by anvil 20, a dowel 42 being adapted to key stem 40 to driven member 20. A spring 44 encircling stem 40 and bearing at one end against the head 46 of stem 40 and at the other end against washer 48 seated on spider 34, normally urges jaws 32 to a position out of engagement with jaws 30 of driven member 20 thus permitting rotation of driving member 10 with respect to driven member 20. Movement of driving member 10 in an axial direction is restricted by stem 40 through a shoulder 50 at the reduced end 52 in a bushing 54 mounted in hammer 10. Bushing 54 acts as a thrust bearing for shoulder 50.

Magnetic means is provided to urge the movable jaws 32 periodically into engagement with the other set of jaws 30 on anvil 20. In this instance, a permanent magnet 56 is mounted in the rearward portion of spider 34 and encircling stem 40 while a similar permanent magnet 58 is mounted on stem 40 in close spaced axial relationship to magnet 56. Magnets 56 and 58 are in apposition to each other and in their rearmost position of spider 34 their adjacent faces are very close as shown in FIG. 1. Magnets 56 and 58 cannot turn with respect to the members on which they are mounted. Magnet 56 is held on spider 34 by suitable dowels 60 and magnet 58 is secured to stem 40 by a transverse pin 62. As is indicated in FIG. 1 and FIG. 2, the poles of magnets 56 and 58 are angularly disposed in a plane transverse to the axis of driven member 20 which is also the axis of stem 40 and of driving member 10. They are equal in number, preferably, so that when driving member 10 rotates with respect to driven member 20 like poles will be facing each other and at other times unlike poles will face each other. The arrangement of the poles with respect to the jaws 32 of driving member 10 and jaws 30 of driven member 20 is such that when like poles of the magnets 56 and 58 face each other those jaws will be out of registry with each other and consequently the repelling force of magnets 56 and 58 with respect to each other will urge spider 34 in a direction of driven member 20 in opposition to the compression of spring 44. Also when the unlike poles of magnets 56 and 58 face each other spider 34 is withdrawn with the assistance of spring 44 from engaging position with respect to the driving member 20.

In operation, if it is assumed that the apparatus is in the position shown in FIG. 1, and the working implement (not shown) which is attached to squared end 28 of driven member 20 is positioned to engage a work piece (not shown), a suitable control device (not shown) is actuated to cause operation of the motor 16 which in turn rotates shaft 18. Rotation of shaft 18 is transmitted to the driving member 10 through the splined connection between shaft 18 and driving member 10. In the rundown phase of operation, when the work piece offers little or no resistance to rotation, driving member 10 and spider 34, carried by driving member 10, will rotate relative to driven member 20 until the magnet 56 reaches an angular position relative to magnet 58 such that the torque, induced by the attraction and repelling forces of the poles of magnets 56 and 58, equals the magnitude of the torque resisting rotation caused by the work piece, the friction between driven member 20, stem 40 and the inertia of those members at which time driven member 20 will rotate at the same speed as driving member 10. When the magnitude of the torque resisting rotation increases above the maximum magnetically induced torque the tool will automatically function to produce impacting, as will hereinafter be fully explained.

With an increased magnitude of the torque resisting rotation of driven member 20 above the maximum magnetically induced torque, driving member 10 will rotate relative to driven member 20, thus causing magnet 56 to rotate relative to magnet 58. As the unlike poles part and the like poles come into registry the repulsion resulting between the unlike poles of magnets 56 and 58 drive spider 34 forward. Although this repulsion diminishes, as the magnets separate, momentum of the spider carries jaws 32 forward to strike jaws 30. The aforementioned torque induced by the attraction and repelling forces of the poles of magnets 56 and 58 when the poles are angularly displaced with respect to each other, serves, before and during the axial forward movement of spider 34, to snub or hold driven member 20 and working implement (not shown) tight against the work piece (not shown) and to take-up any rotational looseness in those members, so that the full effect of the impact between the jaws 30 and 32 of driven member 20 and driving member 10, respectively, is transmitted to the work piece. Compression of spring 44 returns spider 34 back to disengage the jaws and driving member 10 can then resume its rotation at an accelerated speed. Energy stored during acceleration is expended upon the next impact of the jaws.

To accelerate driving member 10, a motor is required whose power will be dependent upon the length of time permitted for acceleration. If the time is extended, the driving motor 16 can be correspondingly less powerful, or contrarily, if the power of motor 16 remains the same, driving member 10 will be accelerated to a greater velocity in the longer time available. Either condition is desirable. With a lighter motor the tool is lighter, or with the higher speed due to greater acceleration the force of the blow will be increased, it being well understood that the energy stored in a moving body varies as the square of its velocity.

The arrangement described in FIGS. 1 and 2 is adapted to strike one blow per revolution. The number of blows per revolution can be increased by the arrangement shown in FIGS. 4 and 5. In describing FIG. 4 and FIG. 5, the reference characters used will be the same and the parts will be the same where the parts are identical. Thus in housing 14 is mounted the driven member 20 provided with jaws 30. Likewise, motor 16 is adapted to drive the driving member 10' journaled in anti-friction bearings 12 and spider 34' is provided with jaws 32' movable axially to engage jaws 30 and backwardly to disengage. Spring 44 on stem 44 on stem 40' is adapted to bear against washer 48 to urge spider 34 to disengaging position. In this embodiment however magnet 56' is mounted eccentrically in spider 34' and will rotate therewith. Magnet 58' however is arranged to rotate at half the speed of driving member 10'. For this purpose internal gear 100 is mounted in a bore 102 within driving member 10' having the same eccentricity as magnet 56' with respect to the axis of rotation of driven member 10'. Gear 102 which is pinned to magnet 58' is adapted to mesh with a gear 104 carried by stem 40'. In this instance the teeth of pinion 104 are cut directly on the end of stem 40'.

Thus as driving member 10' rotates, gear 100 will rotate at a speed depending upon the gear ratio of pinion 104 and gear 100 which as shown in FIG. 6 is one to two. Therefore, magnet 58' will rotate at half the speed of magnet 56'. The only difference in the interaction of magnets 56' and 58' as compared with magnets 56 and 58 of FIG. 1 and FIG. 2 is that the repulsion therebetween will occur only upon two revolutions of driving member 10' with respect to driven member. Thus, motor 16 has time to increase the velocity of driving member 10' to values very much in excess of that possible with driving member 10 and the impacts will be correspondingly more forceful in the arrangement of FIG. 4 and FIG. 5. By changing the gear ratio of pinion 104 and gear 100 it will be possible to obtain impacts at multiples of one and one-third, one and two-thirds, two and so on, revolutions of driving member 10'. This is of course with three jaws in a set. If other numbers of jaws is used, other obvious gear ratios are likewise useable.

It is contemplated by the present invention that a pair of magnets 106 in the form of discs having a plurality of polarized sections as shown in FIG. 7 or a pair of magnets 108 having a U-shaped configuration, as shown in FIG. 8 may be used, in the impact tools according to this invention, without departing from the scope and spirit of this invention. It is further within the scope and spirit of this invention to fabricate the magnets of ceramic material or other magnetizable material of one piece construction or of a plurality of pieces suitably secured together.

Although several embodiments of the invention have been illustrated and described in detail it is to be expressly understood that the invention is not limited thereto. Various changes can be made in the arrangement of parts without departing from the spirit and scope of the invention, as the same will now be understood by those skilled in the art.

We claim:

1. An intermittently engageable clutch comprising a rotatable driving member, a rotatable driven member coaxial therewith, a set of jaws on each of said members mutually engageable to couple said members, the set of jaws on said driving member being movable with respect thereto to effect engagement and disengagement with the other set of jaws, magnetic means to urge the movable jaws periodically into engagement, and resilient means to separate said sets of jaws.

2. An intermittently engageable clutch comprising a rotatable driving member, a rotatable driven member coaxial therewith, a set of jaws on each of said members mutually engageable to couple said members, the set of jaws on said driving member being movable with respect thereto to effect engagement and disengagement with the other set of jaws, a magnet carried by the movable jaws and rotatable therewith, and a second magnet supported by and in fixed axial, spatial and rotational relation to said driven member, each said magnet having poles angularly spaced apart about the axis of said members, the poles of one magnet being in apposition to the poles of the other magnet.

3. A clutch as set forth in claim 2 in which said magnets are permanently magnetized.

4. An intermittently engageable clutch comprising a rotatable driving member, a rotatable driven member coaxial therewith, a set of jaws on each of said members mutually engageable to couple said members, the set of jaws on said driving member being movable with respect thereto to effect engagement and disengagement with the other set of jaws, the jaws of each member being angularly spaced apart to permit substantial angular relative movement therebetween without engagement of said sets of jaws, and magnetic means to urge the movable set of jaws axially toward the other set of jaws including a magnet carried by the movable jaws and rotatable therewith, and a second magnet supported by and in fixed axial, spatial and rotational relation to said driven member, each said magnet having poles angularly spaced apart about the axis of said members, the poles of one magnet being in apposition to the poles of the other magnet, said magnets being disposed on their supporting members with their like poles in alignment with each other in the position of disengagement of said sets of jaws.

5. A clutch as set forth in claim 2 in which means is provided to rotate said second magnet in predetermined timed relation to the driven member.

6. A clutch as set forth in claim 2 in which means is provided to rotate said second magnet in predetermined timed relation to the driven member including a gear carried by and rotatable by the driving member and fixed to the second magnet, and a pinion driven by the driven member and in engagement with said gear.

7. An intermittently engageable clutch comprising a rotatable driving member, a spider mounted on said driving member for axial sliding movement thereon and having axially projecting jaws, a rotatable driven member coaxial with the driving member and having jaws projecting in the direction of the first said jaws and adapted to be engaged thereby, a magnet carried by said spider and having poles angularly disposed in a plane transverse to the axis of the driven member, a second magnet supported by said driven member in fixed axial and rotational relation thereto and in juxtaposition to the first said member and having the same number of poles arranged like those of the first said magnet, said magnet poles being positioned with respect to each other so that like poles lie face to face when said spider jaws are out of registry with the jaws of said driven member to impel said spider jaw axially toward said jaws on the driven member, and a spring interposed between said driven member and said spider to urge said spider axially away from said driven member.

8. A clutch as set forth in claim 7 in which is provided a stem supported by and rotationally fixed to said driven member and keying said driven member to said second magnet.

9. A clutch as set forth in claim 8 in which is provided a gear and pinion keying said stem to said second magnet.

10. A clutch as set forth in claim 9 in which said gear is carried by said pinion and said gear is carried on said second magnet and rotated jointly by said driven member and said pinion.

References Cited in the file of this patent

UNITED STATES PATENTS

| | | |
|---|---|---|
| 2,339,531 | Van Sittert et al. | Jan. 18, 1944 |
| 2,711,661 | Shaff | June 28, 1955 |
| 2,790,095 | Peek et al. | Apr. 23, 1957 |
| 2,825,436 | Amtsberg | Mar. 4, 1958 |
| 2,876,878 | Sinclair | Mar. 10, 1959 |
| 2,886,149 | Baermann | May 12, 1959 |
| 2,943,216 | Spodig | June 28, 1960 |